United States Patent Office 2,969,288
Patented Jan. 24, 1961

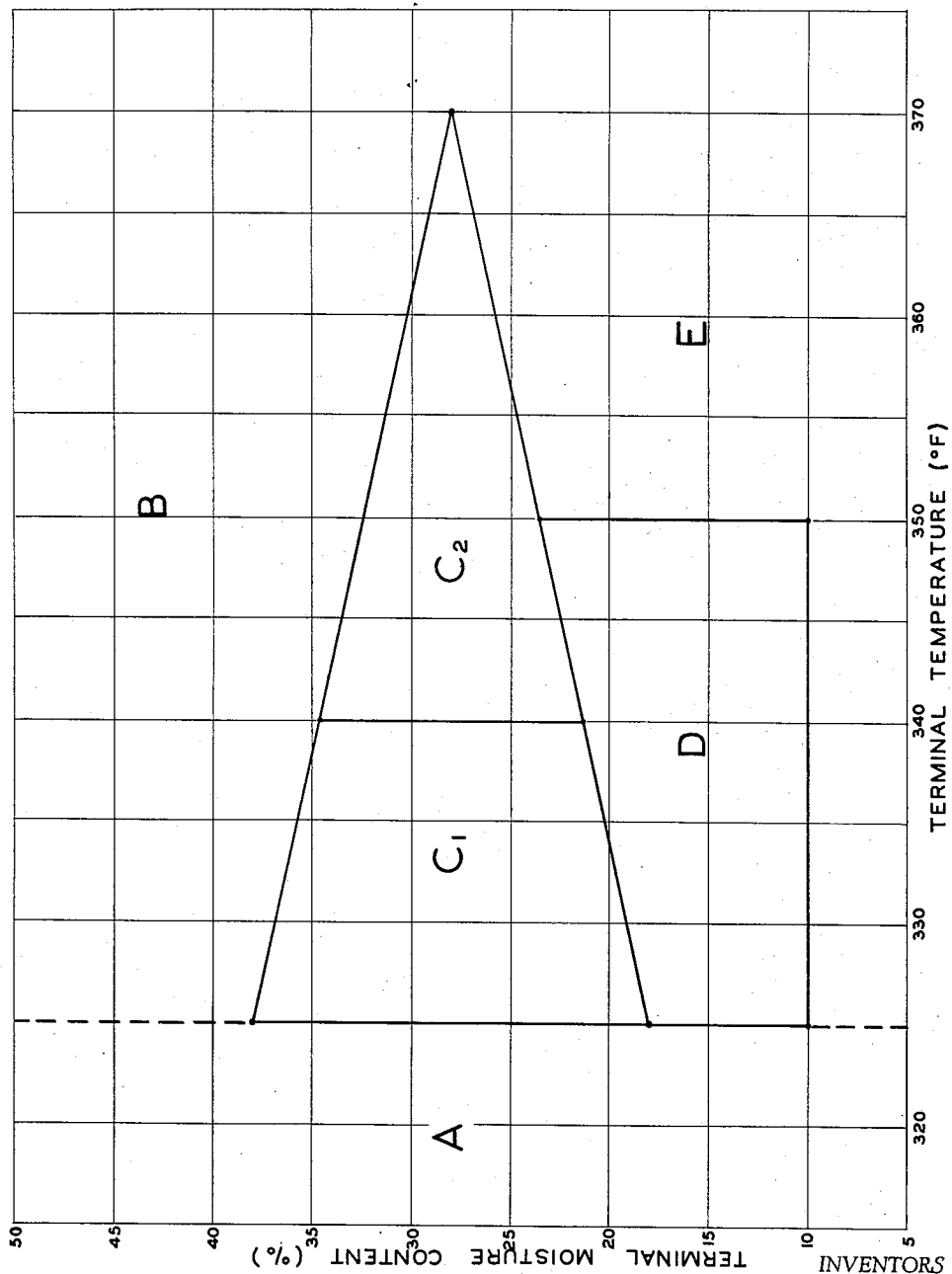

2,969,288

METHOD FOR PREPARING QUICK-COOKING RICE

Charles E. Flynn, Oradell, N.J., and Millard O. Ricker, Oak Park, Ill., assignors to General Foods Corporation, White Plains, N.Y., a corporation of Delaware Filed Feb. 4, 1960, Ser. No. 6,828

3 Claims. (Cl. 99—82)

The present invention relates to a method of preparing quick-cooking rice products. This is a continuation-in-part of United States application Serial No. 700,521, filed December 3, 1957, and Serial No. 370,946, filed July 29, 1953.

Objects of the invention include the provision of a process for preparing quick-cooking rice products capable of extremely high yields, requiring only a limited number of simple manipulations, a small capital investment and simple, readily available equipment and not requiring a separate drying step.

Generally, in the cooking of rice as it is carried out in the home, the rice is immersed in boiling water and after a suitable period is fully gelatinized and hydrated with the result that its volume has been increased 2-3 times as compared with the volume of the original raw rice. It would appear that the amount of enlargement so provided is such that the elastic limit of the rice is not exceeded because upon slowly drying the cooked rice it shrinks to about its original volume. On the other hand, rice which is gun-puffed in order to provide the well-known ready-to-eat breakfast cereal is enlarged 8-10 times the volume of the raw rice. Upon drying no shrinkage occurs and it is impossible to reconstitute this product to provide anything even closely approximating the regularly cooked rice discussed above, thus indicating that the gun-puffing procedure enlarges the rice to such a degree that the elastic limit of the rice is exceeded.

It has now been found that quick-cooking rice products may be provided by means of gun-puffing so long as the degree of enlargement is no more than that effected by the normal cooking procedure as discussed above, namely, of the order of 2-3 times its original size. The conditions required for such gun-puffing, although similar to those employed with the gun-puffing of the prior art by which a ready-to-eat breakfast cereal is provided, are distinguished by the fact that the temperatures employed are distinctly lower and the moisture contents of the rice are considerably higher than are employed for the production of the ready-to-eat breakfast cereal. The conditions of temperature and moisture as discussed above and hereinafter relate to those which are obtained just prior to the release of pressure or the actual step of gun-puffing and, therefore, are generally referred to as "terminal" temperature and moisture conditions. The terminal temperature is the temperature of the rice itself and terminal moisture is the moisture content of the rice. While any feasible amount of pressure may be employed in the gun-puffing to which the present invention relates, the water vapor pressure to which the rice is subjected, whether it represents a partial pressure of the system or the total pressure thereof, is substantially that corresponding to the pressure of saturated steam; i.e., the water vapor pressure, at the terminal temperature selected.

The rice which may be employed in accordance with the process of the present invention may be any of the different varieties and types of rice available, including such varieties as Rexoro, Blue Bonnet, Zenith, and the like. While brown rice may be employed it is generally preferred to use white or completely milled rice since it is this product for which the American consumer has a distinct preference.

As indicated above, the degree of enlargement effected by the gun-puffing should not exceed to a very appreciable degree that normally effected in the course of cooking by immersion in water. To illustrate, 142 g. of raw rice generally has a volume of about 170–190 cc., whereas after cooking by immersion it has a volume of the order of 500–600 cc., the weight having been increased, of course, by virtue of the absorption of water. On the other hand, 142 g. of rice after being gunpuffed to rice of the ready-to-eat breakfast cereal type has a volume of about 1500–1800 cc. Suitable degrees of puffing effected in accordance with the present invention will provide a product in which 142 g. has a volume of 300–600 cc. although somewhat lower and somewhat higher degrees of puffing are sometimes operative to provide a quick-cooking rice product. Upon rehydration 142 g. of rice which has been gun-puffed to such a degree will generally have a volume equal to that of regularly cooked rice; i.e., of the order of 500–600 cc.

The terminal conditions of rice temperature and moisture which should be employed in carrying out the process of the present invention have been found to be interrelated and capable of reasonably exact definition. This is shown by the graph contained in the single figure in which the terminal moisture content of the rice is plotted against the terminal temperature of the rice. Regardless of the moisture content of the rice no puffing of any appreciable or useful degree is obtained at terminal rice temperatures below about 325° F. Thus, conditions in the area designated by A are not within the purview of the present invention. Similarly, the areas B, D and E define conditions not suitable for the practice of the invention. Use of conditions defined by the area designated by B provides a product which is excessively sticky so that clumps are obtained and a suitable product is not provided. This is in all likelihood due to an excessive moisture content which causes surface stickiness and prevents the provision of discrete, individual rice grains required for a satisfactory product. In the area designated by D, the product obtained is a mixture of quick-cooking rice and highly puffed ready-to-eat breakfast cereal. Conditions in the area designated by E and characterized by relatively lower terminal rice moisture contents and relatively higher terminal rice temperatures provide the greatly enlarged or puffed product generally employed as a ready-to-eat breakfast cereal. The conditions to which the present invention is particularly directed are found in areas $C_1$ and $C_2$. It is preferred to use the conditions designated by area $C_1$. The product provided by the conditions of $C_2$ is generally of a softer texture and is an entirely satisfactory product except that it is believed that the general public prefers the somewhat firmer product provided by the use of the conditions of area $C_1$.

When operating in accordance with the present invention, the rice is also subjected to a water vapor pressure equal to the pressure of saturated steam at the particular terminal temperature selected. For example, at 325° F., a pressure of 80 lbs./sq. in. (gauge) and at 370° F., a pressure of 150 lbs./sq. in. (gauge) must be employed. Additional pressure may be used by introduction of air, carbon dioxide, nitrogen or some other inert gas, but serves no known useful purpose.

Upon obtaining the terminal conditions as discussed above, it is then only necessary to release the pressure to a lower pressure. Generally, from the standpoint of ease of operation, releasing the pressure of the puffing apparatus to the atmosphere is preferred and no known advantage is gained by releasing to other than atmospheric pressure.

The manner of achieving the necessary terminal conditions is not critical. Generally, the desired moisture content of the rice may be provided by soaking the ordinary milled rice of commerce having a moisture content of about 10–14% in an excess of water or spraying or tumbling the same with water prior to any other treatment. A 30 minute soak at room temperature increases the moisture content to about 30–35% and it is only necessary to slightly increase the soaking temperature to reach 38% which is about the maximum and should be employed as shown by the graph of the single figure. If a lesser terminal moisture content is desired the rice may be soaked for a shorter period of time. In some cases it may be desired to dry the rice.

Following soaking or drying, the rice may be stored or "tempered" in order to insure even distribution of moisture throughout the individual rice grains. The length of the tempering period can be varied according to the temperature of storage and the amount of water added to or removed from the rice but usually requires only about 30–60 minutes at room temperature for the purposes of the present invention.

The moisture content of the rice may also be increased by condensation thereon of the steam which is generally used in the process to heat the rice and provide the necessary pressure. For example, if a moisture content of 38% is desired, rice may be soaked at room temperature to about 30–35% and an additional 8–3% of moisture may be provided by condensation of the steam used to provide the temperature and pressure necessary for gun-puffing. Also, it is satisfactory to use this method to raise the moisture content of rice which is introduced into the puffing gun at lower moisture contents, say about 12% moisture to a value as high as, say 24% and in this manner a separate soaking step is avoided. It is generally undesirable, however, to rely on this manner of proceeding to add very large amounts of moisture to the rice because the moisture which has condensed on the surface of the rice does not become as thoroughly distributed throughout the rice grain as when soaking is used and tends to increase the amount of gelatinization which occurs on the surface of the rice particles during heating resulting in a somewhat sticky product.

The desired terminal rice temperature may be obtained by any method of heating, including conduction, radiant, dielectric or convection heating, or a combination of the same. It is preferred that the terminal temperature be achieved by the use of steam. The heat conductivity of rice is such that the required terminal temperature is easily and quickly reached in this manner. In so doing the required water vapor pressure within each grain is automatically obtained. Prior to steaming, however, it is preferred to raise the temperature of the rice by dry heat. This prevents excessive condensation of steam on the rice and permits better control of terminal rice moisture. This can be done simply by applying a gas flame to the gun-puffing chamber containing the rice prior to the introduction of steam, the chamber which is usually a horizontal cylinder being rotated about its horizontal axis to tumble the rice and prevent scorching.

It is possible to carry out the process without the use of steam from an external source. The moist rice in the enclosed space may be heated, as for example, by applying a gas flame to the gun-puffing chamber, which is rotated to prevent scorching as aforementioned, with the result that some of the moisture is removed from the rice to provide the necessary water vapor pressure and at the same time leave in the rice enough moisture for a suitable terminal moisture content. As soon as a suitable terminal rice temperature is obtained the pressure is released to effect gun-puffing. This is not a preferred method of operation, however, because removal of the moisture from the rice as a result of the heating largely occurs at the surface of the grains and causes difficulty with regard to controlling the process.

When the above-discussed terminal conditions of rice moisture and temperature have been achieved the water vapor pressure in the gun-puffing apparatus is equivalent to about the pressure of saturated steam at the terminal temperature of the rice. The only thing remaining is to release the pressure of the system to the atmosphere in a manner as instantaneous as possible. This can be accomplished in any device capable of quick-opening as, for example, a kettle with a quickly releasable closure. The well-known gun-puffing apparatus from the cereal industry is particularly well adapted for the required quick opening. This gun comprises a cylinder capable of withstanding the pressure employed and containing a movable closure at one end. The closure is locked while the terminal conditions of rice temperature and moisture content and water vapor pressure are being effected. The lock is releasable by a trigger mechanism and is released either manually or automatically when the desired conditions have been obtained. Puffing guns are of various kinds and any of them may be used, for example, puffing guns which operate in a continuous manner of the type described in U.S. Patent No. 2,622,985 are satisfactory.

The time required to achieve the necessary terminal conditions and the necessary water vapor pressure is not important. The process should be carried out as rapidly as conveniently possible to prevent excessive gelatinization from occurring and, of course, it is obvious that if the rice is held for excessive periods of time at high temperatures and moistures gelatinization will occur to such an extent that a badly clumped product will result. The time ordinarily required to achieve the necessary conditions causes no undesirable gelatinization but on the contrary the amount of gelatinization which occurs in this period is desirable. Time, therefore, is a factor only to the extent that excessive time or delay be avoided.

In order to illustrate the preferred embodiments of the invention the following detailed examples are set forth:

*Example I*

Approximately 8 pounds of ordinary commercially milled rice of the Blue Bonnet variety at 14% moisture was soaked in an excess of water at room temperature for approximately 15 seconds. The rice was then drained thoroughly and allowed to temper at room temperature for 45 minutes. At this point the rice contained approximately 20% moisture by weight and the moisture was uniformly distributed throughout each grain of rice. The soaked rice was then placed in the chamber of a gun-puffing device. This apparatus consisted of a cast iron cylinder 6 inches in diameter and 22½ inches in length, closed at one end and the other end fitted with a hinged door with an air-tight seal secured by a trigger release mechanism. The rice was sealed within the cylinder and a gas flame was applied to the cylinder wall until the rice reached a temperature of about 275° F. At this point saturated steam at a pressure of 90 lbs./sq. in. (gauge) was introduced into the cylinder to raise the temperature of the rice to 330° F. At this point the rice had a moisture content of 29%. The pressure was then instantaneously released to the atmosphere by manually releasing the trigger mechanism. The resulting rice product was essentially completely gelatinized, had a dry volume of 350 cc. per 142 g. and a moisture content of 8–9%. The terminal moisture of the rice was determined by sealing a sample of the rice within the gun imediately prior to release of pressure and then immediately after puffing, cooling the rice contained within the sampling device by packing the exterior of the sampling device with Dry Ice until the device and its contents were cooled to about room temperature. A standard moisture analysis was then immediately carried out.

142 g. of the quick-cooking rice prepared according to the example was placed in 340 cc. of boiling water and allowed to stand in the water for 5 minutes. A product resulted which had a volume of 550 cc., was uniformly cooked, soft textured, and similar in all respects to rice prepared according to conventional means. The volume of 142 g. of the raw rice of the Blue Bonnet variety when cooked in an excess of boiling water for 30 minutes is about 550 cc.

*Example II*

Approximately 8 pounds of ordinary commercial rice of the Rexoro variety at 14% moisture was soaked in an excess of water at room temperature for approximately 30 minutes. The rice was then drained thoroughly and allowed to temper at room temperature for 60 minutes. At this point the rice contained approximately 35% moisture by weight and the moisture was uniformly distributed throughout the rice. The soaked rice was then placed in the chamber of the gun-puffing device described hereinabove in Example I, sealed and a gas flame was applied to the cylinder wall of said device until the rice had reached the temperature of about 325° F., requiring 8–10 minutes. At this point the water vapor pressure within the gun-puffing chamber was about 80 lbs./sq. in. (gauge) and the moisture content of the rice had been decreased to a slight degree. The pressure was then instantaneously released to the atmosphere as described above, the resulting puffed rice being completely gelatinized and having a volume of about 370 cc. per 142 g. and a moisture content of about 10–12%. The terminal moisture of the rice was determined by sealing a sample of the rice within the gun immediately prior to release of pressure and then immediately after puffing, cooling the rice contained within the sampling device by packing the exterior of the sampling device with Dry Ice until the device and its contents were cooled to about room temperature. A standard moisture analysis was then immediately carried out.

Upon reconstitution with water as described in Example I the volume was increased to 560 cc., was thoroughly cooked and otherwise similar in all respects to regularly prepared rice. The volume of 142 g. of raw rice of the Rexoro variety when cooked in an excess of boiling water for 30 minutes is about 550 cc.

*Example III*

Approximately 8 pounds of ordinary milled rice of the Zenith variety at about 12% moisture was placed in the chamber of the gun-puffing device described hereinabove in Example I, sealed and steam at 100 lbs./sq. in. (gauge) was admitted to the chamber to raise the temperature of the rice to about 338° F. This required about 3 minutes and at the end of this time the moisture content of the rice had been raised to about 24%. The pressure was then instantaneously released to the atmosphere as described in Example I and the resulting puffed rice was completely gelatinized, had a volume of 310 cc. per 142 g. and a moisture content of 10–11%. The terminal moisture of the rice was determined by sealing a sample of the rice within the gun immediately prior to release of pressure and then immediately after puffing, cooling the rice contained within the sampling device by packing the exterior of the sampling device with Dry Ice until the device and its contents were cooled to about room temperature. A standard moisture analysis was then immediately carried out.

When reconstituted as described in Example I the cooked rice had a volume of 500 cc., was completely cooked and otherwise similar in all respects to regularly prepared rice. The volume of 142 g. of raw rice of the Zenith variety when cooked in an excess of boiling water for 30 minutes is about 500 cc.

Although the present invention has been described with particular reference to specific operating details, it should be understood that the invention is not limited thereto and therefore reference should be had to the appended claims for a definition of the limits of the invention.

What is claimed is:

1. A process of preparing a dry quick-cooking rice product which comprises subjecting uncooked rice grains to moisture and heat sufficient to uniformly gelatinize the starch in said rice grains in a confined area of high water vapor pressure, said treated rice grains having terminal moisture and temperature conditions which define a point in the areas $C_1$ and $C_2$ of the graph of the single figure, said high water vapor pressure corresponding to the pressure of saturated steam at the terminal temperature selected, said treated rice grains having their terminal moisture evenly distributed throughout the grains and having the starch granules therein substantially unruptured, and suddenly discharging said treated rice grains from said confined area of high water vapor pressure to the atmosphere to puff the grains to a dry volume of 2–3 times the dry volume of said uncooked rice grains, whereby the puffed product is porous and readily rehydratable so as to be quick-cooking.

2. The process of claim 1 in which the terminal moisture and temperature conditions of the rice just prior to puffing are those defined by the area $C_1$ of the graph of the single figure.

3. The process of claim 1 in which the terminal moisture and temperature conditions of the rice just prior to puffing are those defined by the area $C_2$ of the graph of the single figure.

References Cited in the file of this patent

UNITED STATES PATENTS

| | | |
|---|---|---|
| 1,933,158 | Rohn | Oct. 31, 1933 |
| 2,478,438 | Thompson | Aug. 9, 1949 |
| 2,610,124 | Roberts | Sept. 9, 1952 |
| 2,653,100 | Carman et al. | Sept. 22, 1953 |

FOREIGN PATENTS

| | | |
|---|---|---|
| 675,292 | Great Britain | July 9, 1952 |